US012371999B2

(12) United States Patent
McCaslin et al.

(10) Patent No.: US 12,371,999 B2
(45) Date of Patent: Jul. 29, 2025

(54) DAMPING SYSTEM FOR AN INTEGRALLY BLADED ROTOR

(71) Applicant: RTX Corporation, Farmington, CT (US)

(72) Inventors: Lucas O. McCaslin, Middletown, CT (US); Stephen B. Bonarrigo, Farmington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/400,695

(22) Filed: Dec. 29, 2023

(65) Prior Publication Data

US 2025/0215799 A1 Jul. 3, 2025

(51) Int. Cl.
*F01D 5/26* (2006.01)
*F01D 5/02* (2006.01)

(52) U.S. Cl.
CPC ............... *F01D 5/26* (2013.01); *F01D 5/021* (2013.01); *F05D 2260/96* (2013.01)

(58) Field of Classification Search
CPC ......... F01D 5/26; F01D 5/021; F05D 2260/96
See application file for complete search history.

(56) References Cited

U.S. PATENT DOCUMENTS

| | | | | |
|---|---|---|---|---|
| 1,833,754 | A * | 11/1931 | Paget | F01D 5/16 416/500 |
| 2,984,453 | A * | 5/1961 | Heymann | F01D 5/16 416/500 |
| 6,283,707 | B1 * | 9/2001 | Chin | F01D 5/16 416/500 |
| 6,699,015 | B2 | 3/2004 | Villhard | |
| 6,796,408 | B2 | 9/2004 | Sherwin | |
| 8,267,662 | B2 | 9/2012 | Patrick | |
| 8,522,417 | B2 | 9/2013 | Miller | |
| 8,974,884 | B2 | 3/2015 | Fabre | |
| 11,136,888 | B2 * | 10/2021 | Husband | F01D 5/147 |
| 11,371,358 | B2 * | 6/2022 | Chakrabarti | F01D 5/16 |
| 2003/0194324 | A1 | 10/2003 | Davis et al. | |
| 2005/0047918 | A1 * | 3/2005 | Powell | F01D 5/18 416/233 |

(Continued)

OTHER PUBLICATIONS

EP Search Report for EP Patent Application No. 24223244.5 dated Mar. 11, 2025.

*Primary Examiner* — Courtney D Heinle
*Assistant Examiner* — Andrew J Marien
(74) *Attorney, Agent, or Firm* — Getz Balich LLC

(57) ABSTRACT

An integrally bladed disk is provided that includes a disk and a plurality of rotor blades. The disk has an outer radial hub and is configured for rotation around a rotational axis. Each rotor blade of the plurality of rotor blades has an airfoil that extends chordwise between a leading edge and a trailing edge, and extends spanwise between a base end and a blade tip. Each rotor blade includes a damper pocket, a damper body, and a plug. The damper pocket extends into the airfoil from the base end and has a first tapered configuration. The damper body is disposed within the damper pocket, and has a second tapered configuration. The second tapered configuration of the damper body mates with the first tapered configuration of the damper pocket. The plug is disposed to retain the damper body within the damper pocket.

12 Claims, 9 Drawing Sheets

(56) References Cited

U.S. PATENT DOCUMENTS

| | | | | |
|---|---|---|---|---|
| 2006/0120875 | A1 | 6/2006 | Surace | |
| 2008/0025845 | A1* | 1/2008 | Clark | F01D 5/16 416/223 A |
| 2017/0044910 | A1 | 2/2017 | Hartung | |
| 2023/0100869 | A1* | 3/2023 | Devangada | F01D 5/3007 416/232 |
| 2023/0117555 | A1 | 4/2023 | Chen | |

* cited by examiner

DAMPING SYSTEM FOR AN INTEGRALLY BLADED ROTOR

BACKGROUND OF THE INVENTION

1. Technical Field

The present disclosure relates to gas turbine engines in general and to integrally bladed rotors used in gas turbine engines in particular.

2. Background Information

Integrally bladed rotors ("IBR," sometimes referred to as a "bladed disk," or a "blisk") are often used within modern gas turbine engines. An IBR generally is an array of blades affixed to a disk. In those applications wherein an IBR is a rotor stage, the blades (i.e., "rotor blades") extend radially outwardly from the disk and are spaced apart from one another around the circumference of the disk. The rotor blades are very often attached to the disk via an attachment technique such as Linear Friction Welding (LFW). IBRs typically have little to no mechanical damping and yet are utilized in challenging environments where high vibratory stresses can be induced. High vibratory stresses can lead to undesirable High Cycle Fatigue (HCF) damage that may limit the life of the component. It would be beneficial to provide a system and/or method for vibrationally damping blades within an IBR, and one that provides flexibility and reliability in blade design.

SUMMARY

Some modes for carrying out the present disclosure are presented in terms of the aspects and embodiments detailed herein below. The present disclosure is not limited, however, to the described aspects and embodiments and a person skilled in the art will appreciate that other aspects and embodiments of the present disclosure are possible without deviating from the basic concept of the present disclosure. Headings used herein are for organizational purposes only and are not meant to be used to limit the scope of the description or the enclosed claims. As used throughout this application, the word "may" is used in a permissive sense (i.e., meaning having the potential to), rather than the mandatory sense (i.e., meaning must).

According to an aspect of the present disclosure, an integrally bladed disk is provided that includes a disk and a plurality of rotor blades. The disk has an outer radial hub and is configured for rotation around a rotational axis. Each rotor blade of the plurality of rotor blades has an airfoil that extends chordwise between a leading edge and a trailing edge, and extends spanwise between a base end and a blade tip. Each rotor blade includes a damper pocket, a damper body, and a plug. The damper pocket extends into the airfoil from the base end and has a first tapered configuration. The damper body is disposed within the damper pocket, and has a second tapered configuration. The second tapered configuration of the damper body mates with the first tapered configuration of the damper pocket. The plug is disposed to retain the damper body within the damper pocket.

In any of the aspects or embodiments described above and herein, each rotor blade may include a weld collar affixed to the base end of the airfoil, and the weld collar includes a weld collar aperture that is aligned with the damper pocket and configured to receive the damper body.

In any of the aspects or embodiments described above and herein, the plug for each rotor blade may be affixed to the weld collar.

In any of the aspects or embodiments described above and herein, each rotor blade may be affixed to the outer radial hub of the disk at the weld collar.

In any of the aspects or embodiments described above and herein, the first tapered configuration of the damper pocket (DP) may include a first DP side surface and a second DP side surface, and the first DP side surface and the second DP side surface may converge toward one another. The second tapered configuration of the damper body (DB) may include a first DB side surface and a second DB side surface, and the first DB side surface and the second DB side surface may converge toward one another.

In any of the aspects or embodiments described above and herein, the damper body may be a unitary body.

In any of the aspects or embodiments described above and herein, the damper body may include a plurality of components that collectively form the damper body.

In any of the aspects or embodiments described above and herein, the plurality of components that collectively form the damper body may include a first tapered damper body component, a second tapered damper body component, and a central damper body component.

In any of the aspects or embodiments described above and herein, the damper pocket may include a DP top end surface that extends between the first DP side surface and the second DP side surface, and the damper body may include a DB top end surface that extends between the first DB side surface and the second DB side surface. The damper pocket and the damper body may be disposable in an engaged configuration wherein the first DP side surface is in contact with the first DB side surface and the second DP side surface is in contact with the second DB side surface. In the engaged configuration, the DB top end surface may be spaced apart from the DP top end surface.

In any of the aspects or embodiments described above and herein, the first tapered configuration of the damper pocket (DP) may include a DP top side surface and a single DP side surface that extends circumferentially and extends spanwise from the airfoil base end to the DP top side surface, and converges in a direction from the airfoil base end to the DP top side surface. The second tapered configuration of the damper body (DB) may include a DB top side surface, a DB bottom side surface, and a single DB side surface that extends circumferentially and extends between the DB bottom side surface to the DB top side surface, and converges in a direction from the DB bottom side surface to the DB top side surface.

In any of the aspects or embodiments described above and herein, the first tapered configuration of the damper pocket may be a first truncated cone, and the second tapered configuration of the damper body may be a second truncated cone, and the damper pocket and the damper body are disposable in an engaged configuration wherein the single DB side surface is in contact with the single DP side surface.

In any of the aspects or embodiments described above and herein, in the engaged configuration, the DB top side surface may be spaced apart from the DP top side surface.

In any of the aspects or embodiments described above and herein, the plurality of components that collectively form the damper body may include a first damper body component and a second damper body component, and the second damper body component may nest within the first damper body component.

In any of the aspects or embodiments described above and herein, the damper body may comprise a shape memory alloy.

According to an aspect of the present disclosure, a rotor blade portion of an integrally bladed disk is provided that includes an airfoil, a damper pocket, a damper body, a weld collar, and a plug. The airfoil extends chordwise between a leading edge and a trailing edge, and extends spanwise between a base end and a blade tip. The damper pocket extends into the airfoil from the base end and has a first tapered configuration. The damper body is disposed within the damper pocket and has a second tapered configuration. The second tapered configuration of the damper body mates with the first tapered configuration of the damper pocket. The weld collar is affixed to the base end of the airfoil. The weld collar includes a weld collar aperture that is aligned with the damper pocket and configured to receive the damper body. The plug is disposed within the weld collar aperture and affixed to the weld collar.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
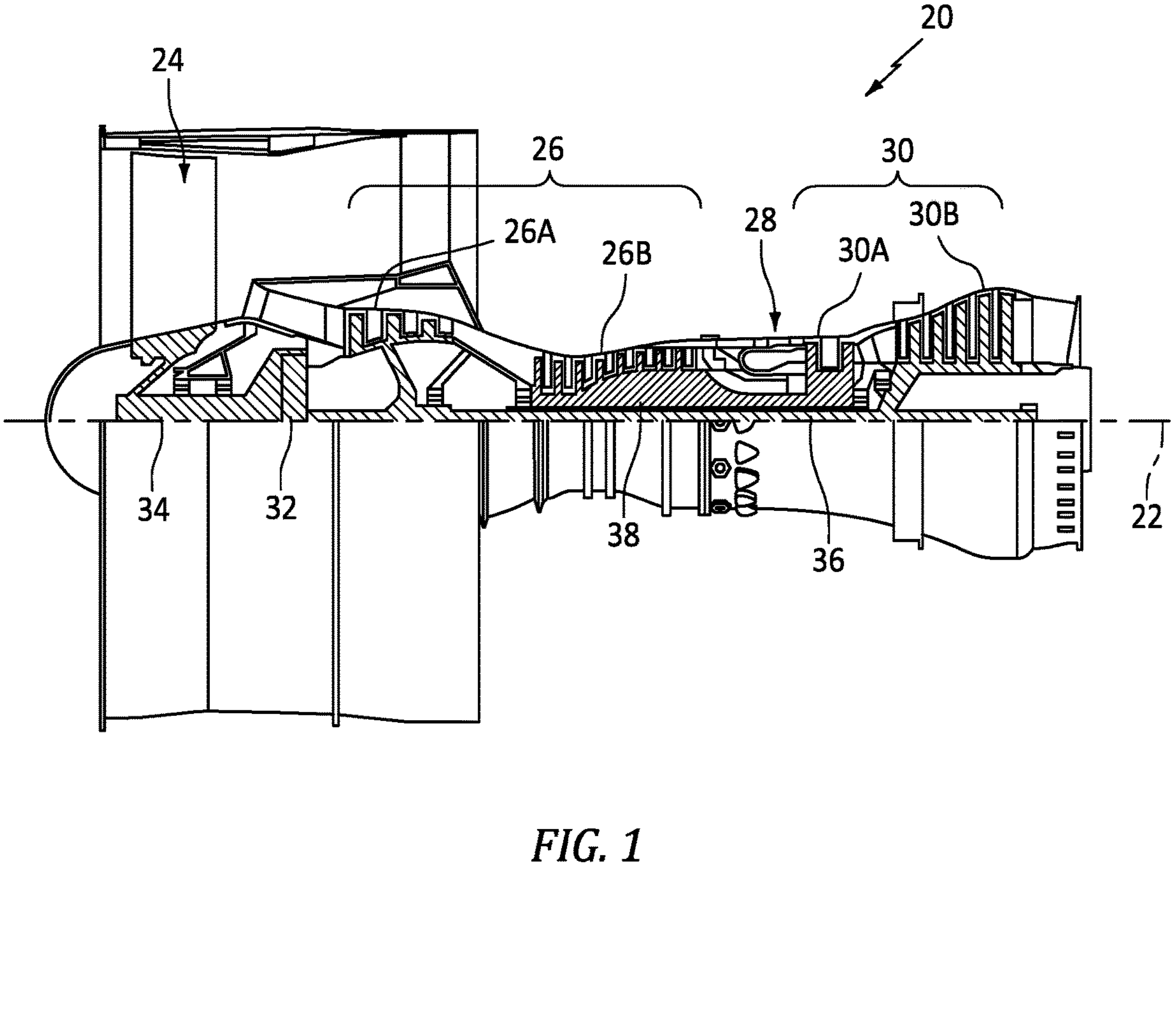
FIG. 1 is a diagrammatic sectional view of a gas turbine engine.

FIG. 1 shows a partially sectioned diagrammatic view of a geared gas turbine engine 20. The gas turbine engine 20 extends along an axial centerline 22 between an upstream air flow inlet and a downstream air flow exhaust. The gas turbine engine 20 includes a fan section 24, a compressor section 26, a combustor section 28, and a turbine section 30. The compressor section includes a low pressure compressor 26A (LPC) and a high pressure compressor 26B (HPC). The turbine section 30 includes a high pressure turbine 30A (HPT) and a low pressure turbine 30B (LPT). The engine 20 sections are arranged sequentially along the centerline 22. The fan section 24 is connected to a geared architecture 32, for example, through a fan shaft 34. The geared architecture 32 and the LPC 26A are connected to and driven by the LPT 30B through a low speed shaft 36. The HPC 26B is connected to and driven by the HPT 30A through a high speed shaft 38. The terms “forward”, “leading”, “aft, “trailing” are used herein to indicate the relative position of a component or surface. As core gas air passes through the engine 20, a “leading edge” of a stator vane or rotor blade encounters core gas air before the “trailing edge” of the same. In a conventional axial engine such as that shown in FIG. 1, the fan section 24 is “forward” of the compressor section 26 and the turbine section 30 is “aft” of the compressor section 26. The terms “inner radial” and “outer radial” refer to relative radial positions from the engine centerline 22. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration.

Figure 2:
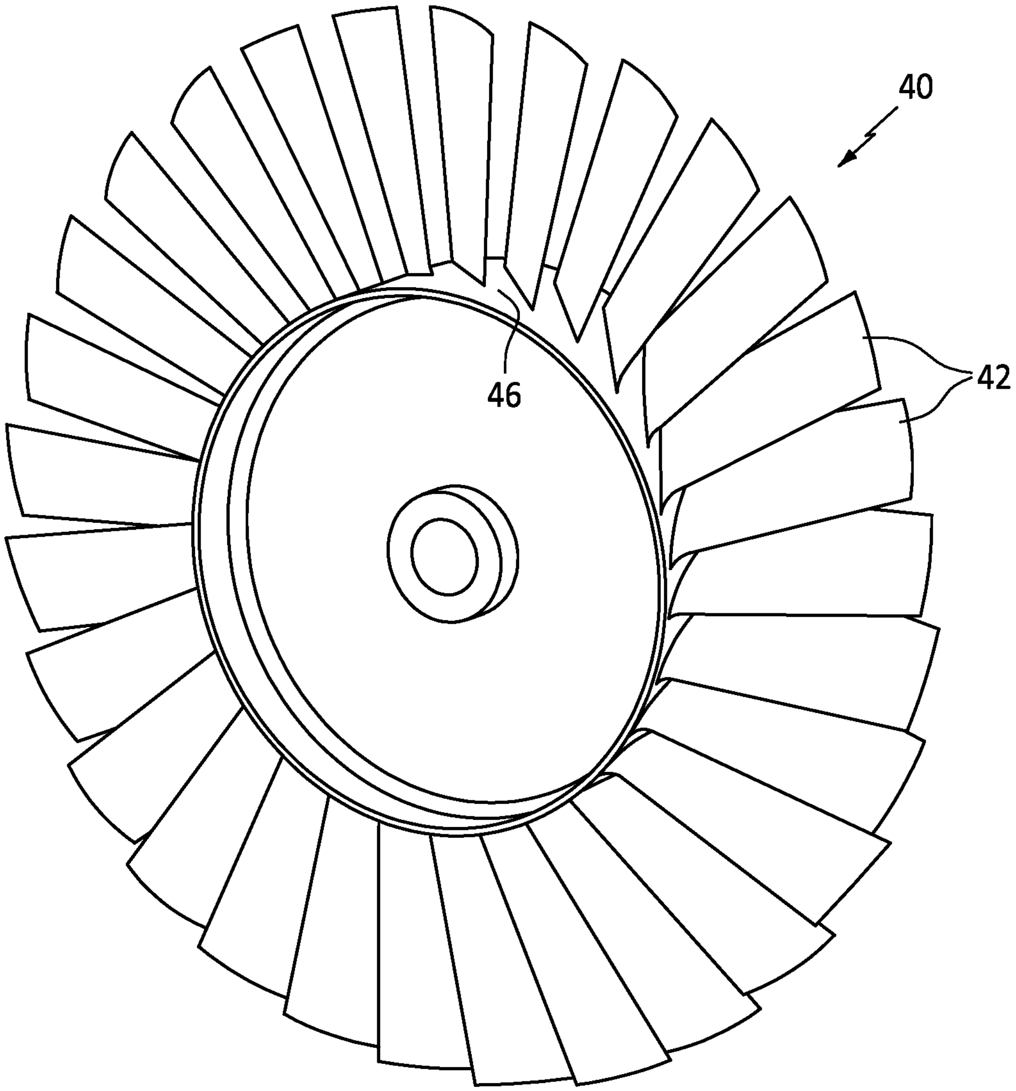
FIG. 2 is a diagrammatic perspective view of an integrally bladed rotor.

Referring to FIG. 2, an integrally bladed rotor 40 (“IBR”) includes a plurality of rotor blades 42 affixed to the outer radial periphery of a disk 44. The rotor blades 42 extend radially outwardly from the disk 44 and are spaced apart one from another around the circumference of the disk 44. An IBR 40 may be used as a rotor within the fan section 24, the compressor section 26, or the turbine section 30 of a gas turbine engine 20. The present disclosure is detailed herein generically as an IBR 40, and that IBR 40 and the rotor blades 42 therewith are not limited to use in any particular rotary section of a gas turbine engine 20 unless specifically indicated. IBRs 40 may be manufactured using several different techniques; e.g., via additive manufacturing, machining from a solid body of metal, or a weldment wherein the individual blades are attached to a disk 44. Aspects of the present disclosure are directed to IBRs 40 produced as a weldment with individual blades attached to a disk 44.

The disk 44 is configured to rotate about an axial centerline; e.g., the engine axial centerline 22. The disk 44 includes an outer radial hub 46 that includes an outer radial hub surface 48 to which the rotor blades 42 are directly or indirectly attached. The outer radial hub 46 may assume a variety of different configurations; e.g., a solid hub, an apertured hub and the like. The present disclosure is not limited to any particular disk hub 46 configuration. The rotor blades 42 may be attached to the disk outer radial hub surface 48 using an attachment technique such as Linear Friction Welding (LFW). The present disclosure is not limited to any particular rotor blade attachment technique.

Figure 3:
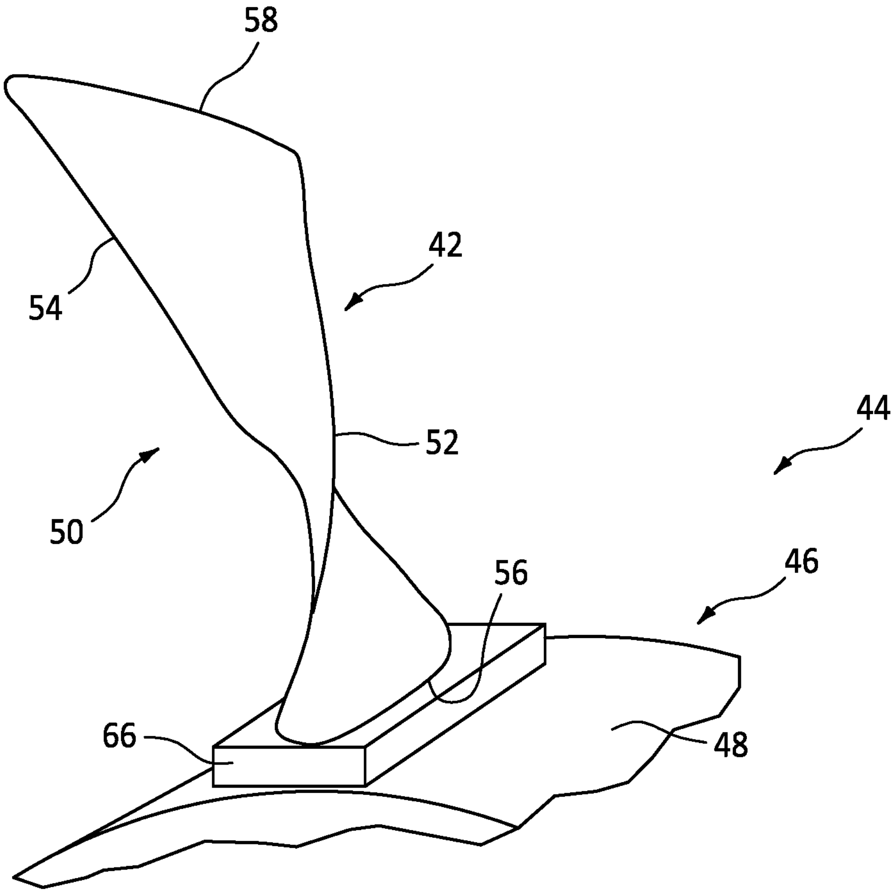
FIG. 3 is a diagrammatic perspective view of a rotor blade attached to an integrally bladed rotor hub.
Figure 4:
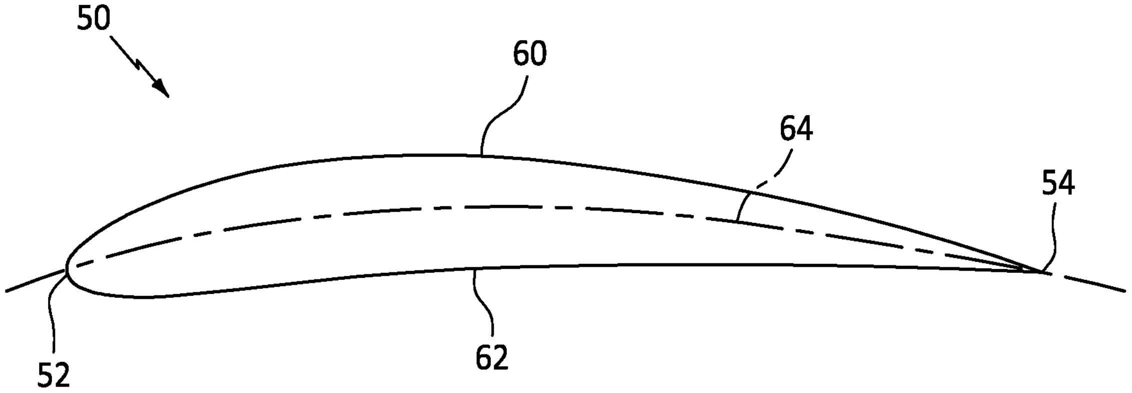
FIG. 4 is a diagrammatic perspective view of an airfoil.

Referring to FIGS. 3 and 4, each rotor blade 42 includes an airfoil 50 that extends chordwise between a leading edge 52 and a trailing edge 54, and extends spanwise between a base end 56 and a blade tip 58. In the assembled IBR 40, the base end 56 of each airfoil 50 is disposed radially inward of the blade tip 58. The airfoil 50 includes a suction side surface 60 and a pressure side surface 62 disposed opposite one another. The chord of the airfoil 50 is the distance between the leading edge 52 and the trailing edge 54. The camber line 64 of the airfoil 50 is an imaginary line which lies halfway between the suction side surface 60 and the pressure side surface 62 of the airfoil 50 and intersects the chord line at the leading and trailing edges 52, 54. The thickness of the rotor blade 42 extends between the suction side surface 60 and the pressure side surface 62. Airfoils 50 may be symmetrical (chord line and camber line 64 coincident) or they may be cambered (chord line and camber line 64 deviate from one another). The configuration of an airfoil 50 (e.g., cross-sectional area, camber, and the like) may be constant spanwise between the base end 56 and the blade tip 58, or the configuration of an airfoil 50 may vary (e.g., different cross-sectional area, different camber, and the like) at different spanwise positions between the base end 56 and the blade tip 58. The present disclosure is not limited to any particular airfoil 50 configuration other than as described herein.

In some present disclosure embodiments, a rotor blade 42 may include a body referred to as a "weld collar 66" affixed to the base end 56 of the airfoil 50 or integrally formed with the airfoil 50. The weld collar 66 typically has a larger area "footprint" than the airfoil 50; e.g., an axial dimension that is greater than the chord of the airfoil 50 and a circumferential dimension (perpendicular to the axial direction) that is greater than the thickness of the airfoil 50 (or the degree to which the airfoil 50 is cambered). In these embodiments, the weld collar 66 of each rotor blade 42 is attached to the disk outer radial hub 46. The present disclosure is not limited to any particular weld collar 66 configuration. The rotor blades 42 may be attached to the disk outer radial hub 46 using an attachment technique such as Linear Friction Welding (LFW). The present disclosure is not limited to any particular rotor blade attachment technique. The present disclosure is not limited to IBRs 40 having rotor blades 42 affixed to (or integrally formed with) a weld collar 66. The present disclosure does not require the use of weld collars 66.

As indicated herein, prior art IBRs of which we are aware typically have little or no mechanical damping and are often utilized in environments where high vibratory stresses can be induced within components of the IBR 40; e.g., within the rotor blades 42. The present disclosure provides structure that produces mechanical damping in IBR rotor blades 42 and that damping is understood to be effective in reducing high vibratory stresses and consequent high cycle fatigue (HCF) damage. As will be detailed herein, embodiments of the present disclosure include a rotor blade 42 having a damper pocket 70, a damper body 72, and a plug 74.

Figure 5:
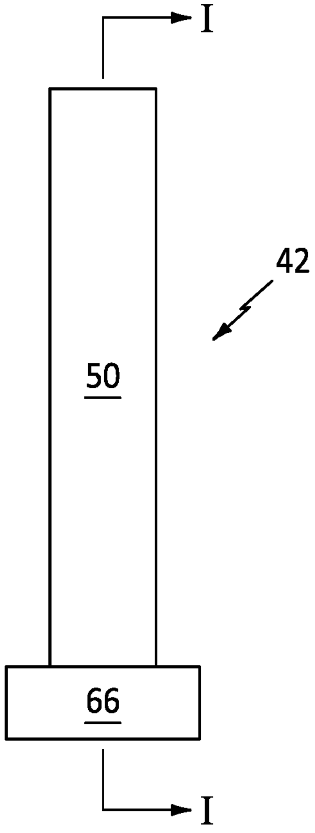
FIGS. 5 and 5A are diagrammatic views of a generic rotor blade, illustrating sectional cut lines.
Figure 5A:
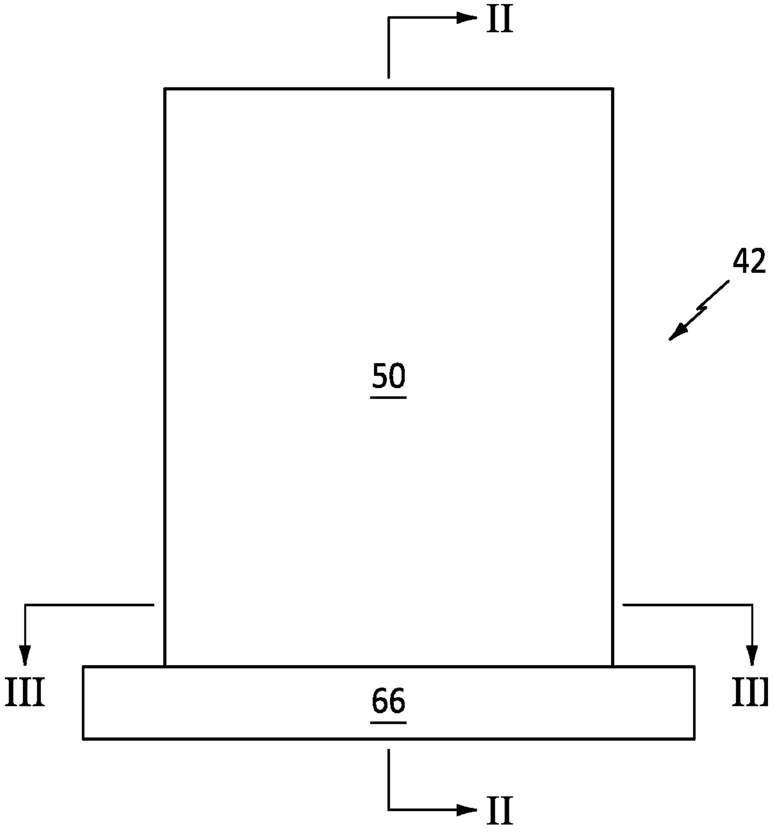
Figure 6:
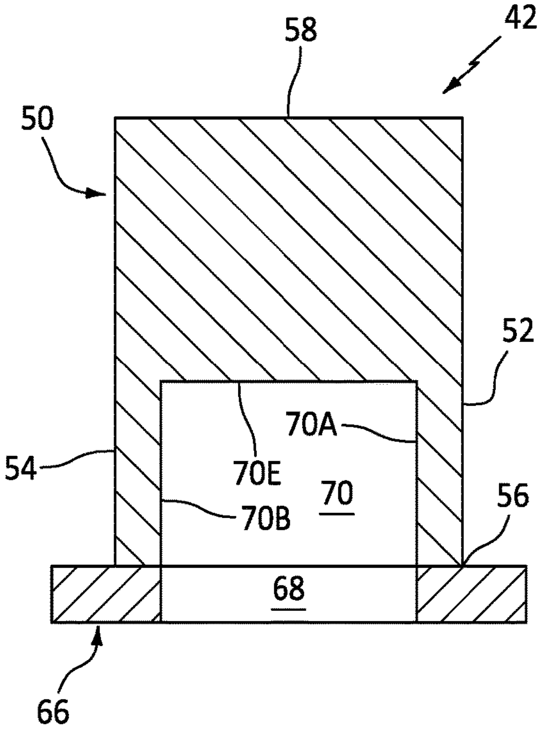
FIG. 6 is a diagrammatic sectional view of a present disclosure rotor blade embodiment taken at the sectional cut line I-I as shown in FIG. 5.
Figure 6A:
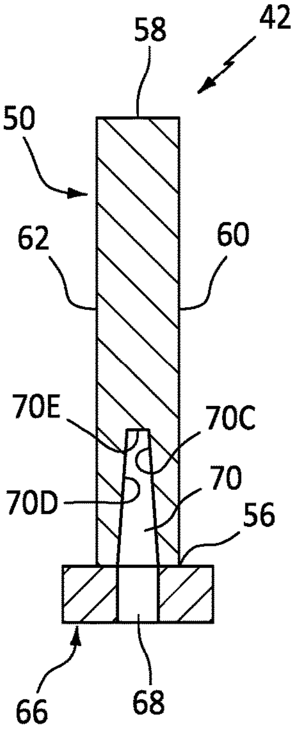
FIG. 6A is a diagrammatic sectional view of a present disclosure rotor blade embodiment taken at the sectional cut line II-II as shown in FIG. 5A.
Figure 6B:
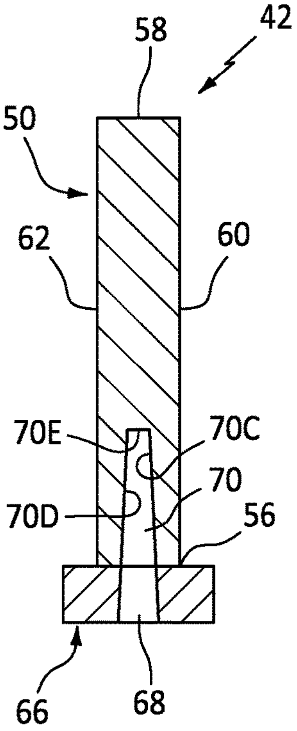
FIG. 6B is a diagrammatic sectional view of a present disclosure rotor blade embodiment taken at the sectional cut line II-II as shown in FIG. 5A.

Referring to FIGS. 6-6B, a rotor blade 42 is diagrammatically shown with a damper pocket 70 extending into the airfoil 50 from the base end 56. In FIGS. 6-6B, the rotor blade 42 is shown with a weld collar 66 affixed to the base end 56 of the airfoil 50. The weld collar 66 includes an aperture ("weld collar aperture 68") that provides access to the damper pocket 70 within the airfoil 50 of the rotor blade 42. FIG. 6 is a sectional view taken at the sectional cut line I-I as shown in FIG. 5 and FIGS. 6A and 6B are sectional views taken at the sectional cut line II-II as shown in FIG. 5A. It should be noted that FIGS. 5 and 5A are provided to illustrate the positioning of sectional cut lines in the various embodiments described herein. Thus, FIGS. 5 and 5A are generically representative of the various embodiments, and specific details of the various embodiments are shown in other FIGURES of the present application.

Figure 9:
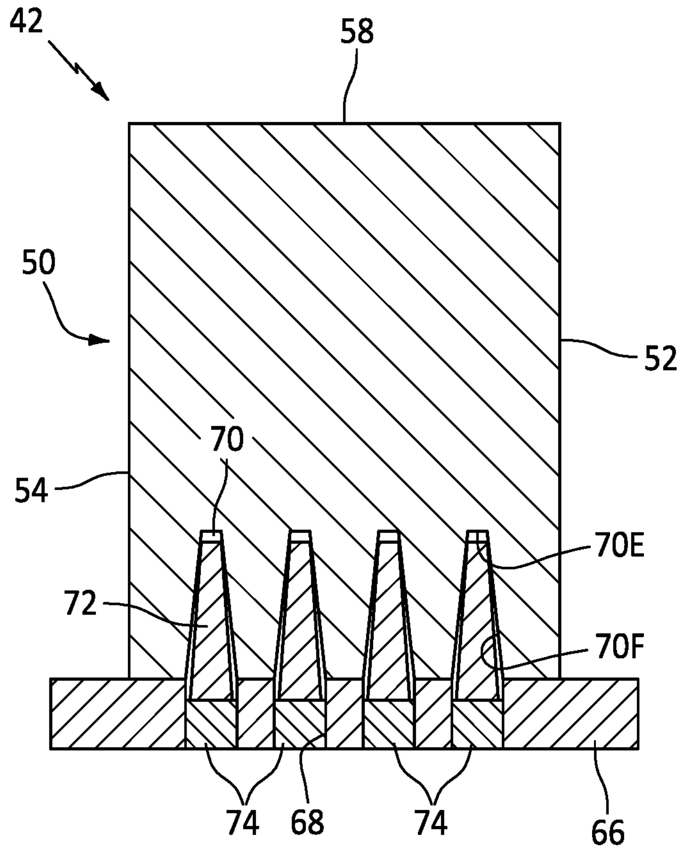
FIG. 9 is a diagrammatic sectional view of a present disclosure rotor blade embodiment taken at the sectional cut line I-I as shown in FIG. 5.
Figure 9A:
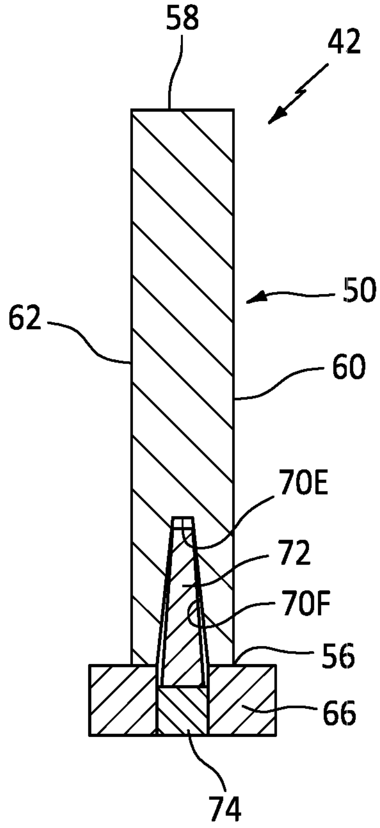
FIG. 9A is a diagrammatic sectional view of the rotor blade embodiment shown in FIG. 9 taken at the sectional cut line II-II as shown in FIG. 5A.
Figure 9B:
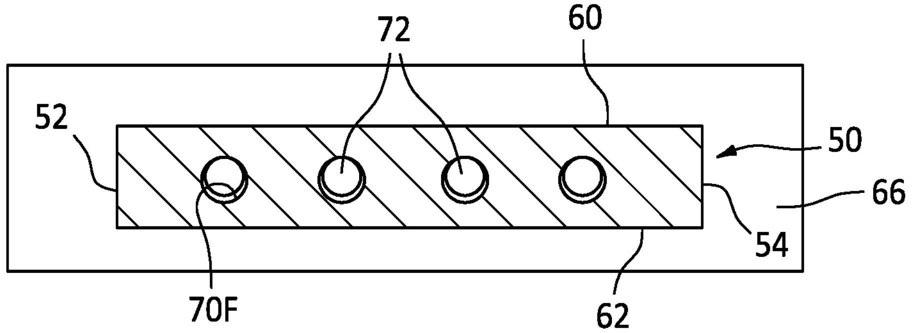
FIG. 9B is a diagrammatic sectional view of the rotor blade embodiment shown in FIG. 9 taken at the sectional cut line III-III as shown in FIG. 5A.

In some embodiments, the damper pocket 70 may include four sides; e.g., like that shown in FIGS. 6 and 6A wherein the damper pocket 70 has a pocket leading edge ("PLE") surface 70A (disposed on the pocket 70 side closest to the airfoil leading edge 52), a pocket trailing edge ("PTE") surface 70B (disposed on the pocket 70 side closest to the airfoil trailing edge 54), a pocket suction side ("PSS") surface 70C (disposed on the pocket 70 side closest to the airfoil suction side 60), and a pocket pressure side ("PPS") surface 70D (disposed on the pocket 70 side closest to the airfoil pressure side 62). The damper pocket 70 diagrammatically shown in FIGS. 6 and 6A may be described as having a fifth side surface (a pocket top surface 70E). The PLE and PTE surfaces 70A, 70B may be parallel one another or one or both may converge towards the other. The PSS and PPS 70C, 70D surfaces may be parallel one another or one or both may converge towards the other. As will be detailed herein, embodiments having at least one converging pocket surface (e.g., PSS and PPS surfaces 70C, 70D converging toward one another) are understood to provide additional damping benefits. In other embodiments, the damper pocket 70 may have fewer than four (4) pocket surfaces or more than four (4) pocket surfaces. An example of a damper pocket 70 that has fewer than four (4) pocket surfaces (i.e., a one side surface and one top surface) is shown in FIGS. 9-9B wherein the damper pocket 70 is formed as a truncated cone with a single arcuate wall surface 70F and a top surface 70E. In FIGS. 6 and 6A, the weld collar aperture 68 is shown as a uniform shape; e.g., constant width and thickness. The present disclosure is not limited to a weld collar aperture 68 that is uniformly shaped (e.g., as shown in FIG. 6A); e.g., in those embodiments wherein the damper pocket 70 has a converging surfaces configuration, the weld collar aperture 68 may also have a converging configuration (e.g., as shown in FIG. 6B).

Figure 7:
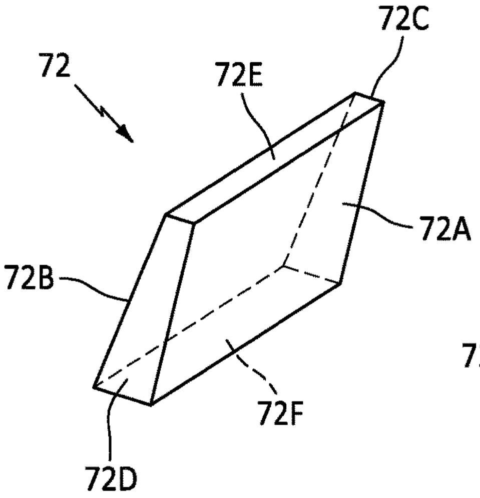
FIG. 7 is a diagrammatic perspective view of a damper body embodiment.
Figure 7A:
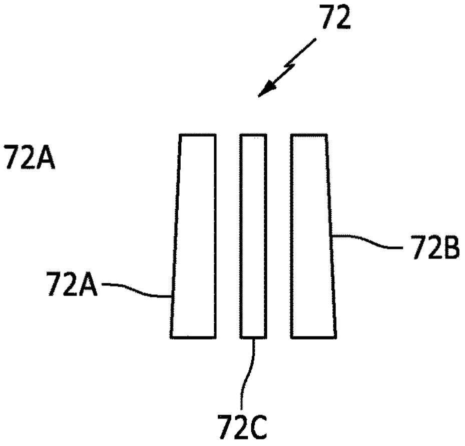
FIG. 7A is a diagrammatic planar view of a damper body embodiment having a plurality of damper body components.
Figure 7B:
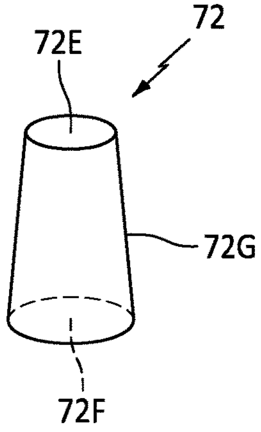
FIG. 7B is a diagrammatic perspective view of a damper body embodiment.

Embodiments of the present disclosure also include at least one damper body 72 configured to be received within and mate with the damper pocket 70 of a rotor blade 42. FIGS. 7 and 7B illustrate a unitary damper body 72 and FIG. 7A illustrates a damper body 72 comprising a plurality of damper body components 72A-C. The specific damper body 72 example shown in FIG. 7A includes a first tapered damper body component 72A, a second tapered damper body component 72B, and a central body component 72C. The present disclosure is not limited to these damper body 72 examples; e.g., present disclosure damper bodies 72 may be unitary or have two or more damper body components, and are not limited to any particular geometric configuration. As stated above, a present disclosure damper body 72 is configured to "mate" with a damper pocket 70 of a rotor blade 42. The term "mate" is used to indicate that the damper body 72 is at least partially received within the damper pocket 70, and is generally configured so that one or more surfaces of the damper body 72 are disposed in contact with one or more surfaces of the damper pocket 70. For example, if the rotor blade damper pocket 70 includes four side surfaces, the damper body 72 may include four side wall surfaces; if the rotor blade damper pocket 70 has a single side wall surface (e.g., a damper pocket 70 configured as a truncated cone-see FIG. 7B), then the damper body 72 may have a mating configuration (i.e., a truncated cone) to create the mating relationship between the damper pocket 70 and the damper body 72. FIG. 7 diagrammatically illustrates a damper body 72 having a tapered configuration defined by a damper body suction side (DBSS) surface 72A, a damper body pressure side (DBPS) surface 72B, a damper body leading edge (DBLE) side surface 72C, a damper body trailing edge (DBTE) side surface 72D, a damper body top side (DBTS) surface 72E, and a damper body bottom side (DBBS) surface 72F. In this embodiment, both the DBSS surface 72A and the DBPS surface 72B converge toward one another in a direction from the DBBS surface 72F towards the DBTS surface 72E; i.e., a tapered configuration. FIG. 7B diagrammatically illustrates a damper body 72 having a tapered configuration defined by a damper body side surface 72G, a damper body top surface 72E, and a damper body bottom surface 72F. In this embodiment, the damper body 72 (configured as a truncated cone) converges in a direction from the damper bottom surface 72F to the damper top surface 72E. As indicated above, the present disclosure is not limited to these damper body 72 configuration examples, and the present disclosure is not limited to any particular damper body 72 geometric configuration.

The plug 74 is a body that may be utilized to maintain the damper body 72 within the damper pocket 70. In those rotor blade 42 embodiments that include a weld collar 66, the plug 74 may be configured to be received within the weld collar aperture 68. In those rotor blade 42 embodiments that do not include a weld collar 66, the plug 74 may be configured to be received within a portion of the damper pocket 70. The plug 74 is affixed to the weld collar 66 (or airfoil 50) after the damper body 72 is inserted into the damper pocket 70. The plug 74 may be affixed by weldment, or mechanical fastener, or the like. The plug 74 may comprise the same material as the damper body 72, or the same material as the weld collar 66, or a different material.

Figure 8:
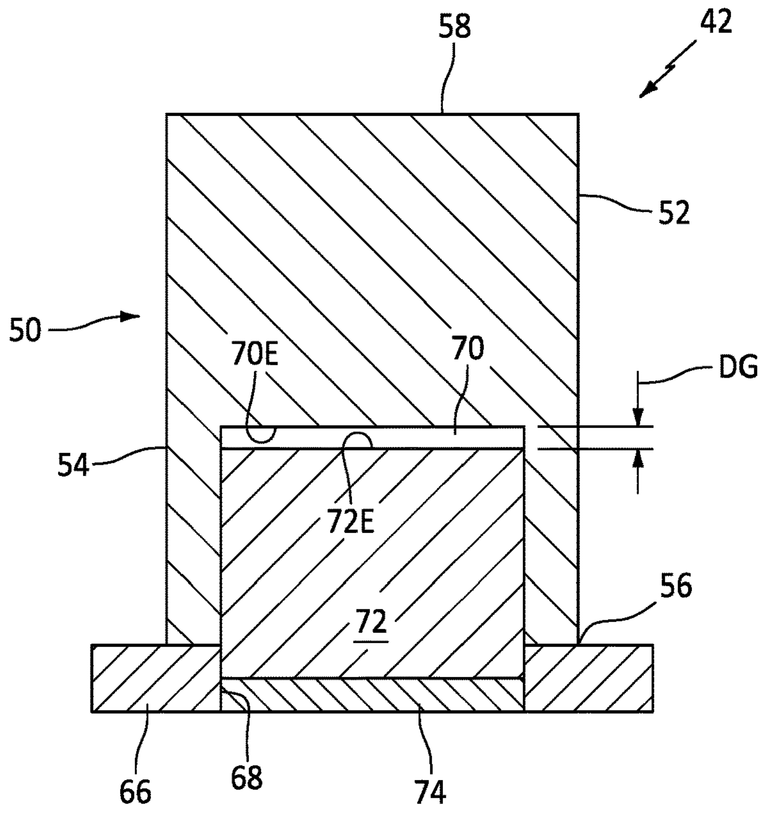
FIG. 8 is a diagrammatic sectional view of a present disclosure rotor blade embodiment taken at the sectional cut line I-I as shown in FIG. 5.
Figure 8A:
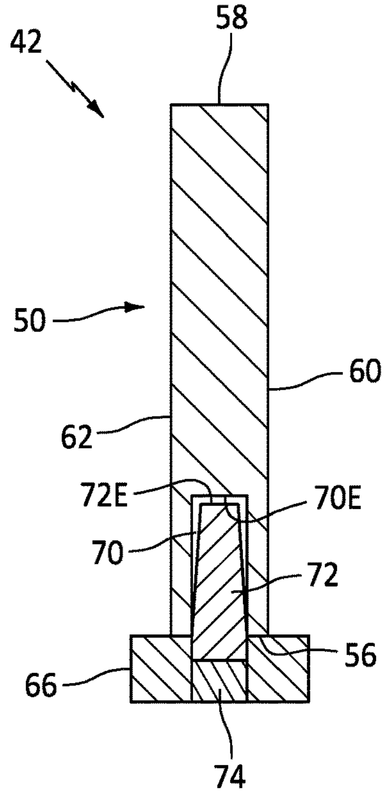
FIG. 8A is a diagrammatic sectional view of a present disclosure rotor blade embodiment taken at the sectional cut line II-II as shown in FIG. 5A.
Figure 8B:
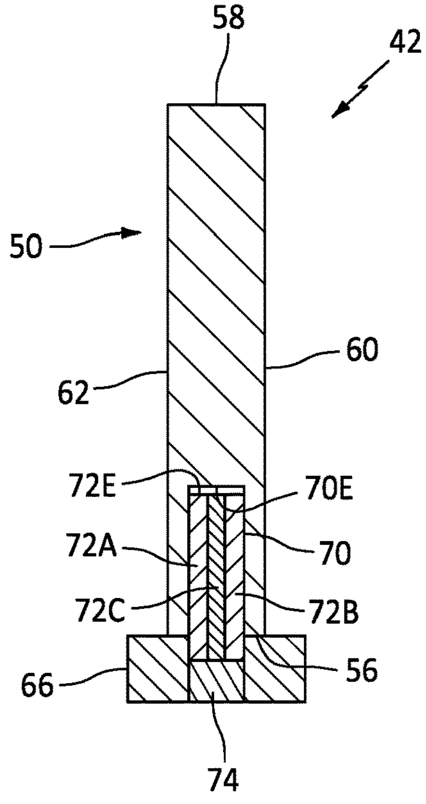
FIG. 8B is a diagrammatic sectional view of a present disclosure rotor blade embodiment taken at the sectional cut line II-II as shown in FIG. 5A.

FIGS. 8-8B diagrammatically illustrate an present disclosure rotor blade 42 embodiment having a weld collar 66. FIG. 8 is a sectional view taken at the sectional cut line I-I as shown in FIG. 5 and FIGS. 8A and 8B are sectional views taken at the sectional cut line II-II as shown in FIG. 5A. FIG. 8A diagrammatically illustrates a unitary damper body 72 and a damper pocket 70, each respectively having a pair of converging surfaces that mate with the converging surfaces of the other. FIG. 8B diagrammatically illustrates a damper body 72 example like that shown in FIG. 7A that includes a first tapered damper body component 72A, a second tapered damper body component 72B, and a central damper body component 72C. The first and second tapered damper body components 72A, 72B mate with the converging surfaces of the damper pocket 70. The embodiments diagrammatically shown in FIGS. 8-8B include a plug 74 disposed in the weld collar aperture 68.

In some embodiments (like that shown in FIGS. 8-8B), the depth of the damper pocket 70 may exceed the length of the damper body 72 when the damper body 72 is fully received within the damper pocket 70; e.g., the difference shown as depth gap "DG" in FIG. 8. In similar fashion, the plug 74 may not fill the entire weld collar aperture 68. As will be detailed herein, additional space may be allowed on either side of the damper body 72 to accommodate damper body 72 movement.

FIGS. 9-9B diagrammatically illustrate an present disclosure rotor blade 42 embodiment having a weld collar 66. FIG. 9 is a sectional view taken at the sectional cut line I-I as shown in FIG. 5, FIG. 9A is a sectional views taken at the sectional cut line II-II as shown in FIG. 5A, and FIG. 9B is a sectional views taken at the sectional cut line III-III as shown in FIG. 5A. FIGS. 9-9B diagrammatically illustrate a unitary damper body 72 configured as a truncated cone disposed in a damper pocket 70 configured as a truncated cone. The embodiments diagrammatically shown in FIGS. 9-9B include a plug 74 disposed in each weld collar aperture 68.

Figure 10:
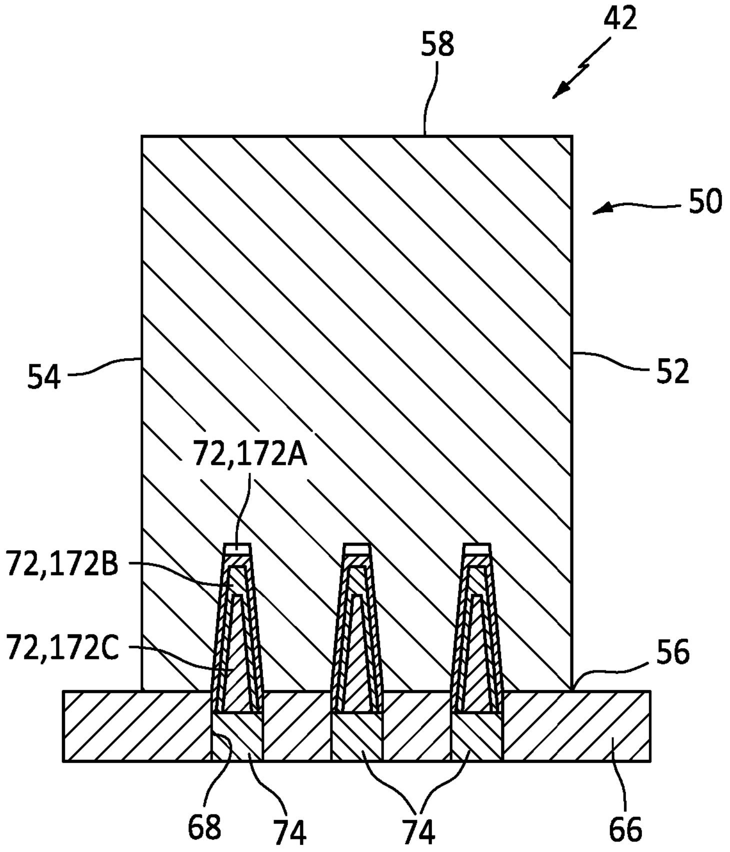
FIG. 10 is a diagrammatic sectional view of a present disclosure rotor blade embodiment taken at the sectional cut line I-I as shown in FIG. 5.
Figure 10A:
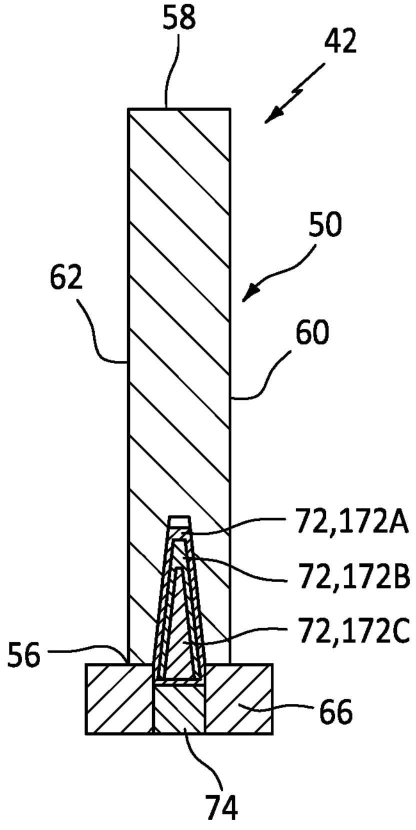
FIG. 10A is a diagrammatic sectional view of the rotor blade embodiment shown in FIG. 10 taken at the sectional cut line II-II as shown in FIG. 5A.
Figure 10B:
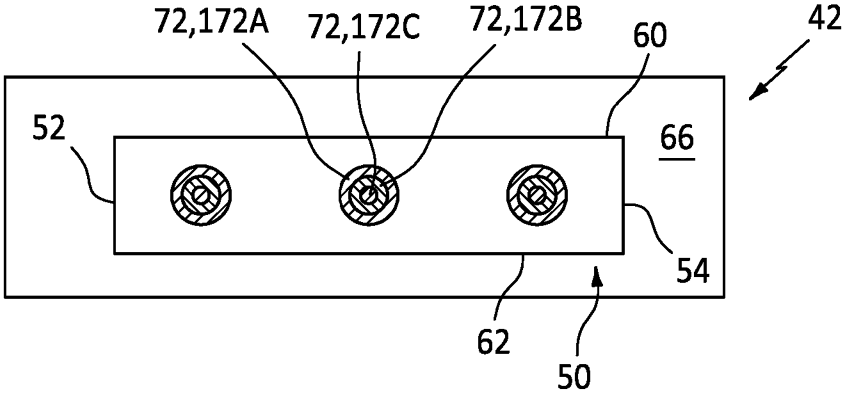
FIG. 10B is a diagrammatic sectional view of the rotor blade embodiment shown in FIG. 10 taken at the sectional cut line III-III as shown in FIG. 5A.

FIGS. 10-10B diagrammatically illustrate an present disclosure rotor blade 42 embodiment having a weld collar 66. FIG. 10 is a sectional view taken at the sectional cut line I-I as shown in FIG. 5, FIG. 10A is a sectional views taken at the sectional cut line II-II as shown in FIG. 5A, and FIG. 10B is a sectional views taken at the sectional cut line III-III as shown in FIG. 5A. FIGS. 10-10B diagrammatically illustrate a plurality of damper bodies 72, each comprising a plurality of damper body components 172A-C. In this specific example, each damper body 72 includes three nested truncated cones; e.g., a first damper body component 172A in the form of a hollow truncated cone configured to engage with the side wall of a damper pocket 70 formed as a truncated cone, a second damper body component 172B in the form of a hollow truncated cone configured to engage with a truncated cone pocket disposed in the first damper body component 172A, and a third damper body component 172C in the form of a truncated cone configured to engage with a truncated cone pocket disposed in the second damper body component 172B. The embodiments diagrammatically shown in FIGS. 10-10B include a plug 74 disposed in each weld collar aperture 68.

Figure 11:
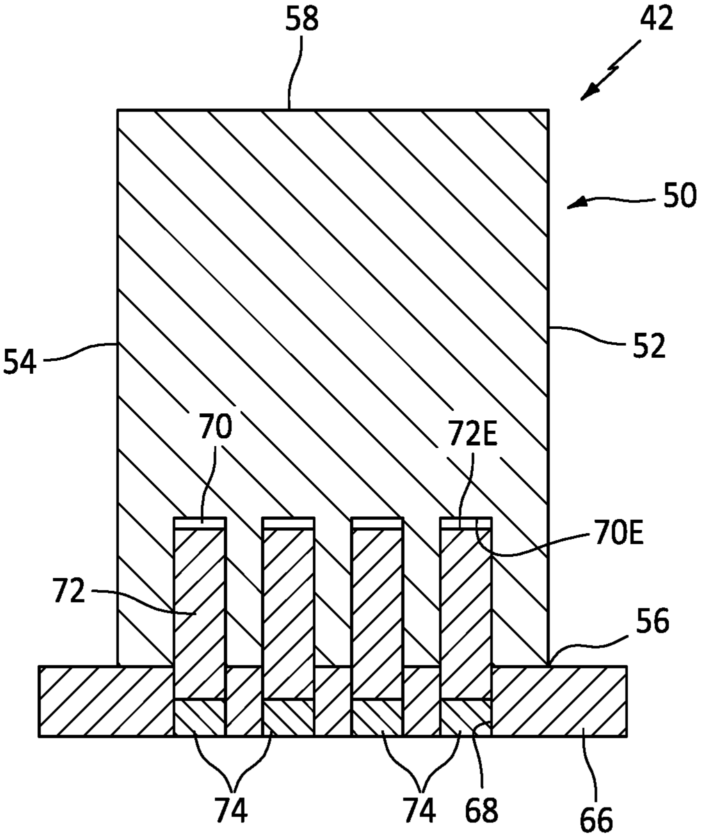
FIG. 11 is a diagrammatic sectional view of a present disclosure rotor blade embodiment taken at the sectional cut line I-I as shown in FIG. 5.
Figure 11A:
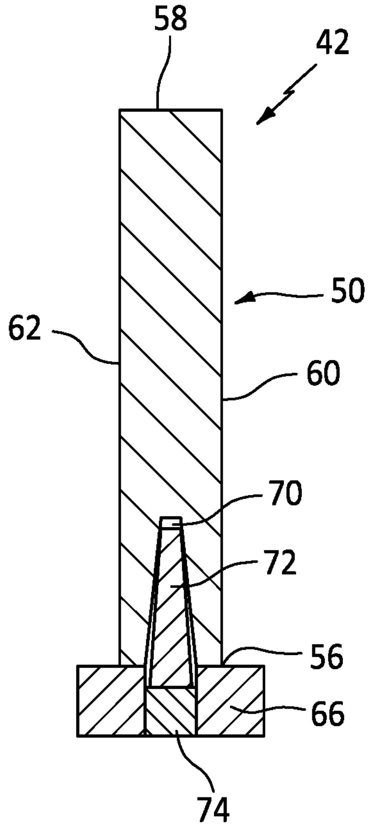
FIG. 11A is a diagrammatic sectional view of the rotor blade embodiment shown in FIG. 11 taken at the sectional cut line II-II as shown in FIG. 5A.
Figure 11B:
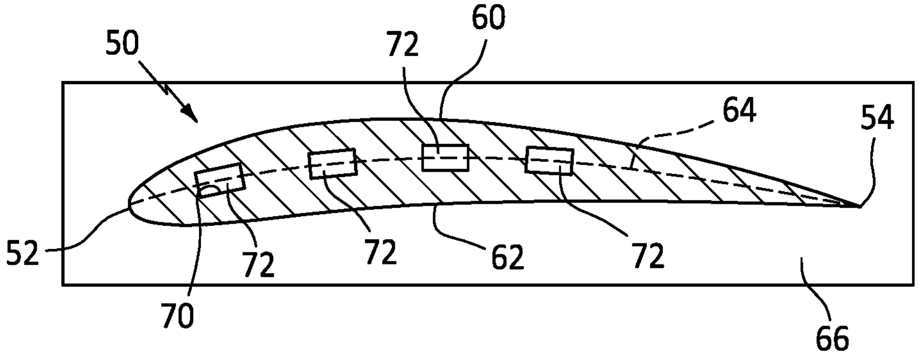
FIG. 11B is a diagrammatic sectional view of the rotor blade embodiment shown in FIG. 11 taken at the sectional cut line III-III as shown in FIG. 5A.

FIGS. 11-11B diagrammatically illustrate an present disclosure rotor blade 42 embodiment having a weld collar 66. FIG. 11 is a sectional view taken at the sectional cut line I-I as shown in FIG. 5, FIG. 11A is a sectional views taken at the sectional cut line II-II as shown in FIG. 5A, and FIG. 11B is a sectional views taken at the sectional cut line III-III as shown in FIG. 5A. FIGS. 11-11B diagrammatically illustrate a present disclosure embodiment wherein a plurality of damper bodies (each shown as a unitary damper body 72—but not limited thereto) are disposed within damper pockets 70 disposed along a camber line 64 of a cambered airfoil 50. The plurality of damper bodies and damper pockets 70 are understood to be useful in rotor blades 42 having a cambered airfoil 50; e.g., where the configuration of a single damper pocket 70/damper body 72 may otherwise be limited limit in view of the cambering. The embodiments diagrammatically shown in FIGS. 11-11B include a plug 74 disposed in each weld collar aperture 68.

The damper body 72 may comprise a variety of different materials. As will be detailed herein, the damper body 72 is configured to frictionally engage with the damper pocket 70 and the frictional engagement therebetween produces a dissipation of vibrational energy and consequent damping of undesirable vibrational modes that may produce high vibratory stresses and High Cycle Fatigue (HCF) damage. Damper body 72 embodiments may comprise any material that is capable of producing the frictional engagement between the damper body 72 and the damper pocket 70 that produces the desired vibrational energy dissipation. In some embodiments, a damper body 72 may be formed from a shape memory alloy ("SMA"); e.g., a metal alloy that may be deformed under certain operating conditions and "remembers" its' shape prior to being deformed. It is understood that in some applications, a damper body 72 formed from a SMA may provide additional inherent damping during material phase changes that the SMA damper body 72 experiences.

In the manufacturing of a present disclosure IBR 40, a damper body 72 (a unitary body or a collective body formed from a plurality of components) is disposed within the damper pocket 70 of a rotor blade 42 to be attached to the disk 44 of the IBR 40. The mating tapered configurations of the damper body 72 and the damper pocket 70 are chosen so that at least one side surface of the damper body 72 engages with a side surface of the damper pocket 70. As indicated, the depth of the damper pocket 70 may exceed the length of the damper body 72 when the damper body 72 is fully received within the damper pocket 70. In those rotor blade 42 embodiments that include a weld collar 66, the damper body 72 may extend into the weld collar aperture 68. After the damper body 72 is disposed within the damper pocket 70/weld collar 66, the plug 74 is inserted into the weld collar aperture 68 and is affixed (e.g., welded) to the weld collar 66. The rotor blade 42 is subsequently attached to the disk hub 46; e.g., via a linear friction welding (LFW) technique. The plug 74 provides an interface between the damper body 72 and the weld collar 66 surface attached to the disk 44 to prevent the rotor blade attachment technique (e.g., LFW) from adversely affecting the damper body 72 during the rotor blade attachment process.

In the operation of the IBR 40, the damper body 72 disposed within each rotor blade 42 portion of the IBR 40 will be subject to centrifugal force as the IBR 40 rotates within the engine 20. The mating tapered configurations of the damper body 72 and the damper pocket 70 facilitates contact between the respective tapered surfaces; e.g., the faster the IBR 40 rotates, the greater the normal force produced by the mass of the damper on the pocket surface. Over time, one or both of the damper body 72 and damper pocket 70 tapered surfaces may frictionally wear. The mating tapered configurations of the damper body 72 and the damper pocket 70 ensure that the desired frictional contact will be maintained. In those embodiments wherein the depth of the damper pocket 70 exceeds the length of the damper body 72 when the damper body 72 is fully received within the damper pocket 70 (e.g., difference "DG"-see FIG. 8), the gap therebetween allows for some amount of damper body 72 positional change as a result of frictional wear and the desired dissipation of vibrational energy regardless of the frictional wear.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. An integrally bladed disk, comprising:

a disk having an outer radial hub, the disk configured for rotation around a rotational axis;

a plurality of rotor blades, each having an airfoil, the airfoil extending chordwise between a leading edge and a trailing edge, and extending spanwise between a base end and a blade tip;

wherein each said rotor blade includes:

a damper pocket (DP) extending into the airfoil from the base end, the damper pocket having a first tapered configuration, the first tapered configuration including a first DP side surface and a second DP side surface, the damper pocket including a DP top end surface that extends between the first DP side surface and the second DP side surface, and the first DP side surface and the second DP side surface converge toward one another;

a damper body (DB) disposed within the damper pocket, wherein the damper body has a second tapered configuration, the damper body including a DB top end surface that extends between a first DB side surface and a second DB side surface, wherein the second tapered configuration of the damper body mates with the first tapered configuration of the damper pocket, the second tapered configuration including the first DB side surface and the second DB side surface, and the first DB side surface and the second DB side surface converge toward one another;

a weld collar affixed to the base end of the airfoil, and the weld collar includes a weld collar aperture that is aligned with the damper pocket and configured to receive the damper body; and a plug disposed to retain the damper body within the damper pocket;

wherein each said rotor blade is affixed to a surface of the outer radial hub of the disk at the weld collar;

wherein the damper pocket and the damper body are disposable in an engaged configuration wherein the first DP side surface is in contact with the first DB side surface and the second DP side surface is in contact with the second DB side surface, and in the engaged configuration, the DB top end surface is spaced apart from the DP top end surface.

2. The integrally bladed disk of claim 1, wherein the plug for each said rotor blade is affixed to the weld collar.

3. The integrally bladed disk of claim 1, wherein the damper body is a unitary body.

4. The integrally bladed disk of claim 1, wherein the damper body includes a plurality of components that collectively form the damper body.

5. The integrally bladed disk of claim 4, wherein the plurality of components that collectively form the damper body includes a first tapered damper body component, a second tapered damper body component, and a central damper body component.

6. The integrally bladed disk of claim 1, wherein the damper body comprises a shape memory alloy.

7. An integrally bladed disk, comprising:

a disk having an outer radial hub, the disk configured for rotation around a rotational axis;

a plurality of rotor blades, each having an airfoil, the airfoil extending chordwise between a leading edge and a trailing edge, and extending spanwise between a base end and a blade tip;

wherein each said rotor blade includes:

a damper pocket (DP) extending into the airfoil from the base end, the damper pocket having a first tapered configuration and a DP top end, the first tapered configuration of the damper pocket includes a first DP side surface and a second DP side surface, the first DP side surface and the second DP side surface converge toward one another, and the DP top end extends between the first DP side surface and the second DP side surface;

a damper body (DB) disposable within the damper pocket in an engaged configuration, wherein the damper body has a second tapered configuration, the second tapered configuration of the damper body includes a first DB side surface and a second DB side surface, and the first DB side surface and the second DB side surface converge toward one another, the damper body including a DB top end surface that extends between the first DB side surface and the second DB side surface, wherein the second tapered configuration of the damper body mates with the first tapered configuration of the damper pocket; and a plug disposed to retain the damper body within the damper pocket;

wherein in the engaged configuration:

the DB top end surface is spaced apart from the DP top end, and the first DP side surface is in contact with the first DB side surface and the second DP side surface is in contact with the second DB side surface.

8. The integrally bladed disk of claim 7, wherein each said rotor blade includes a weld collar affixed to the base end of the airfoil, and the weld collar includes a weld collar aperture that is aligned with the damper pocket and configured to receive the damper body.

9. The integrally bladed disk of claim 8, wherein the plug for each said rotor blade is affixed to the weld collar.

10. The integrally bladed disk of claim 9, wherein each said rotor blade is affixed to the outer radial hub of the disk at the weld collar.

11. The integrally bladed disk of claim 7, wherein the damper body is a unitary body.

12. The integrally bladed disk of claim 7, wherein the damper body includes a plurality of components that collectively form the damper body.

* * * * *